United States Patent
Götz

(10) Patent No.: US 6,637,807 B2
(45) Date of Patent: Oct. 28, 2003

(54) FRAME FOR A BATTERY-OPERATED INDUSTRIAL TRUCK

(75) Inventor: Bernhard Götz, Aschaffenburg (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 10/245,868

(22) Filed: Sep. 17, 2002

(65) Prior Publication Data

US 2003/0070860 A1 Apr. 17, 2003

(30) Foreign Application Priority Data

Sep. 18, 2001 (DE) ........................................ 101 45 991

(51) Int. Cl.[7] ................................................ B60J 10/00
(52) U.S. Cl. ..................... 296/183; 180/68.5; 180/65.1; 296/187
(58) Field of Search ................................ 296/183, 185, 296/186, 203.01, 204, 205, 209, 37.14, 187; 280/304.1, DIG. 5, 43.12; 180/68.5, 312, 907, 6.48, 282, 333, 65.1; 187/231

(56) References Cited

U.S. PATENT DOCUMENTS

| | | | | |
|---|---|---|---|---|
| 4,026,378 A | * | 5/1977 | DePriester | 180/68.5 |
| 4,042,054 A | * | 8/1977 | Ward | 180/68.5 |
| 4,058,182 A | * | 11/1977 | Huber | 180/68.5 |
| 4,065,012 A | * | 12/1977 | Rocco | 280/43.12 |
| 4,362,220 A | * | 12/1982 | Baston | 180/68.5 |
| 4,429,761 A | * | 2/1984 | Haddock et al. | 180/68.5 |
| 4,432,424 A | * | 2/1984 | Abels et al. | 180/6.48 |
| 5,022,476 A | * | 6/1991 | Weege | 280/304.1 |
| 5,031,713 A | * | 7/1991 | Criscuolo | 296/187 |
| 5,036,938 A | * | 8/1991 | Blount et al. | 180/68.5 |
| 6,105,706 A | * | 8/2000 | Cooper | 180/282 |
| 6,112,612 A | * | 9/2000 | Seksaria et al. | 180/333 |
| 6,125,971 A | * | 10/2000 | Niebuhr et al. | 187/231 |
| 6,231,067 B1 | * | 5/2001 | Johnson et al. | 180/65.1 |
| 2001/0013437 A1 | * | 8/2001 | Husted et al. | 180/68.5 |
| 2002/0134599 A1 | * | 9/2002 | Magens et al. | 180/68.5 |

FOREIGN PATENT DOCUMENTS

| | | | |
|---|---|---|---|
| DE | 3839618 A1 | * | 5/1990 |
| DE | 42 19 786 A1 | * | 12/1993 |
| DE | 100 05 285 A1 | | 8/2000 |
| GB | 2 065 066 | * | 6/1981 |
| JP | 3 109130 | * | 5/1991 |
| JP | 3 109 131 | * | 5/1991 |
| JP | 4 24487 | * | 9/1992 |
| JP | 5 105160 | * | 4/1993 |

* cited by examiner

*Primary Examiner*—Kiran Patel
(74) *Attorney, Agent, or Firm*—Webb Ziesenheim Logsdon Orkin & Hanson, P.C.

(57) ABSTRACT

A frame for a battery-operated industrial truck includes a forward frame segment, a middle frame segment, and a rear frame segment. The middle frame segment is designed to hold a battery block and is provided with a frame top opening and a frame side opening through which the battery block can be inserted in the frame and removed again. To make it possible to easily replace the battery block using different battery replacement systems, the invention teaches that the frame side opening is connected without interruption to a frame bottom opening of the middle frame segment. To increase stability, the middle frame segment has at least one deflection-proof and torsion-proof longitudinal beam that connects the forward frame segment with the rear frame segment, and is preferably realized in the form of a hollow profile.

18 Claims, 4 Drawing Sheets

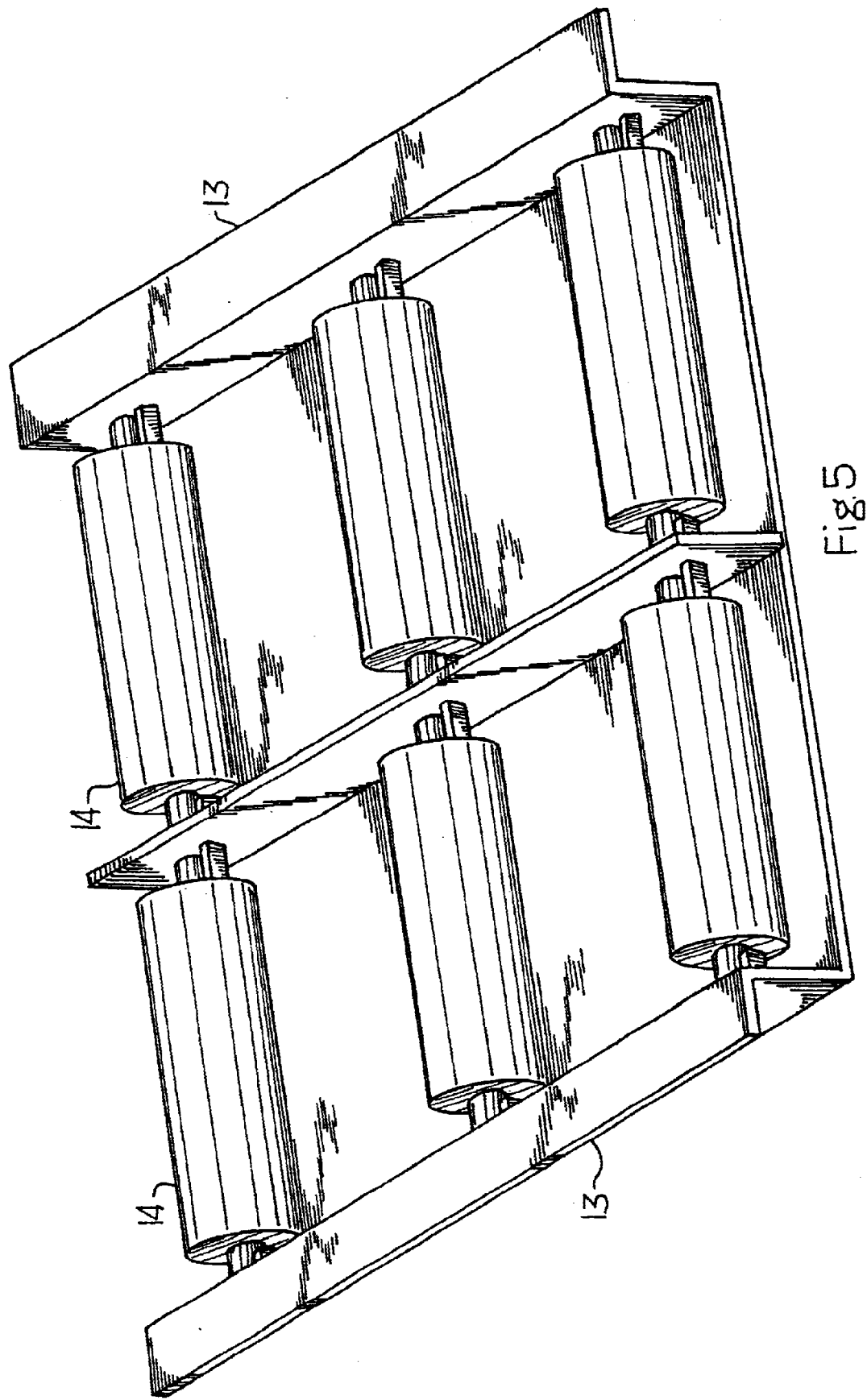

FRAME FOR A BATTERY-OPERATED INDUSTRIAL TRUCK

CROSS REFERENCE TO RELATED APPLICATION

This application corresponds to German Application No. 101 45 991.2, filed Sep. 18, 2001, which is herein incorporated by reference in its entirety.

BACKGROUND OF THE INVENTION

1. Field of the Invention

This invention relates generally to a frame for a battery-operated industrial truck having a forward frame segment, a middle frame segment, and a rear frame segment, wherein the middle frame segment is designed to hold a battery block and is provided with a frame opening and a frame side opening through which the battery block can be inserted into the frame and removed from the frame.

2. Technical Considerations

Known systems provide for the removal of the battery block of an industrial truck from the frame from above, or the insertion of a battery block into the frame from above, by means of cargo-handling gear which is fastened to a crane or a similar device. DE 100 05 285 A1 is based on this known art and describes a generic frame. The battery block can also be inserted into the frame or extracted from the frame laterally through a lateral opening in the frame that extends to the vicinity of a floor platform of the middle frame segment. In this case, therefore, the battery replacement can be done horizontally.

The known art also describes systems in which the battery block can be removed from and/or inserted into the industrial truck by means of a fork-lift truck with the prongs of the fork. For this purpose, appropriate pockets are fastened to the top of the battery block or corresponding free space is created underneath the battery block into which the prongs can be inserted. However, these systems increase the vertical dimension of the overall structure.

The operator of an industrial truck must initially select or purchase a certain type of battery replacement system compatible with the particular industrial truck in use if he wants to minimize the time, effort, and expense of the battery replacement operation. If the operator has initially selected a certain battery replacement system but subsequently wants to use a different or third-party device designed for use with another battery replacement system, he frequently has to perform complex adaptations on the third-party device if he wants to use the third-party device in his own operations.

The manufacturers of industrial trucks offer industrial trucks, the frames of which are adapted to the respective battery replacement system used by the operator. It is, therefore, necessary for the manufacturers to keep various frame variants ready.

An object of this invention is to provide a frame of the type generally described above but by means of which the battery block can be replaced easily using different battery replacement systems.

SUMMARY OF THE INVENTION

The invention provides an industrial truck frame having a side opening connected without interruption to a lower frame opening of a middle frame segment.

As a result of the frame of the invention, it is possible to design a universal battery replacement procedure and also to make the battery replacement easier. The battery block of an industrial truck that is equipped with the frame taught by the invention can be replaced without modifications to the vehicle using all sorts of different systems, such as cranes, fork-lift trucks, low-lift platform trucks, etc. For this purpose, the frame can be open on the top, as well as on one side, and/or on the bottom. The invention does not require any increase in the vertical dimension of the frame.

For example, it is possible to replace the battery from above using a crane. On the other hand, if a roller table is available for the battery replacement, the battery block can be extracted horizontally from the industrial truck and pushed onto the roller table. Additionally, the battery block can also be lowered and raised through the frame bottom opening by the forks of a fork-lift truck, so that it can then be removed through the side opening.

Therefore, the battery block can be replaced using a wide variety of auxiliary equipment of the known art, whereby the same frame can be used in all cases. Consequently, there is no need to adapt the industrial truck to the battery replacement system. If necessary, the battery block can be moved in the vertical and horizontal directions simultaneously. To remove or insert the battery block, it is not necessary to lift the block above one edge of the frame.

In one advantageous embodiment of the invention, the middle frame segment has at least one deflection-proof and torsion-proof longitudinal beam that connects the forward frame segment with the rear frame segment.

As a result of this design, the requirements for stability are satisfied in spite of the plurality of frame openings in the frame taught by the invention. It should be noted that the expression "without interruption" as used above is not intended to mean that to further increase stability during travel, for example, an attachable and detachable strut or one that can be quickly and easily installed and removed cannot be attached to the frame in the vicinity of the transition between the bottom opening and the side opening in the frame. This optional strut, which can connect the forward frame segment with the rear frame segment, can then be removed before the battery replacement operation, depending on the battery replacement system used, and can then be reattached.

The deflection-proof and torsion-proof longitudinal beam of the middle frame segment can be advantageously realized in the form of a hollow profile.

In this case, the longitudinal beam can have two pieces of sheet metal that are connected with each other and form the hollow profile, whereby one of the pieces of sheet metal is realized in the form of the sidewall of the middle frame segment. This construction integrates a plurality of functions into one assembly and minimizes manufacturing costs.

It is also advantageous if the frame is connected with a driver protection roof that is realized in the form of a load-bearing component of the frame. The driver protection roof thereby contributes to the stability of the frame. The deflection-proof and torsion-proof longitudinal beam can thereby be made more lightweight and can, therefore, have a smaller cross section.

In one development of the invention, the frame side opening can be closed by a door that can be pivoted around a substantially vertical axis.

If the door can be locked in a right-angle open position, it can serve as an insertion guide if the battery block is replaced through the frame side opening. In particular, when a battery block hanging on the cargo-handling gear of a crane is used, the swinging of the battery block can be stopped by the door, which means that the battery block can be inserted rapidly into the frame of the industrial truck and set down in the correct position.

To further improve the universal applicability of the frame taught by the invention, a roller device that supports the battery block can be inserted in the vicinity of the frame bottom opening. The battery block can thereby be rolled sideways out of the frame.

BRIEF DESCRIPTION OF THE DRAWINGS

Additional advantages and details of the invention are explained below with reference to the exemplary embodiments illustrated in the accompanying schematic figures, in which:

FIG. 5 is a roller device of the invention that can be inserted in the frame.

DESCRIPTION OF THE PREFERRED EMBODIMENTS

Figure 1:
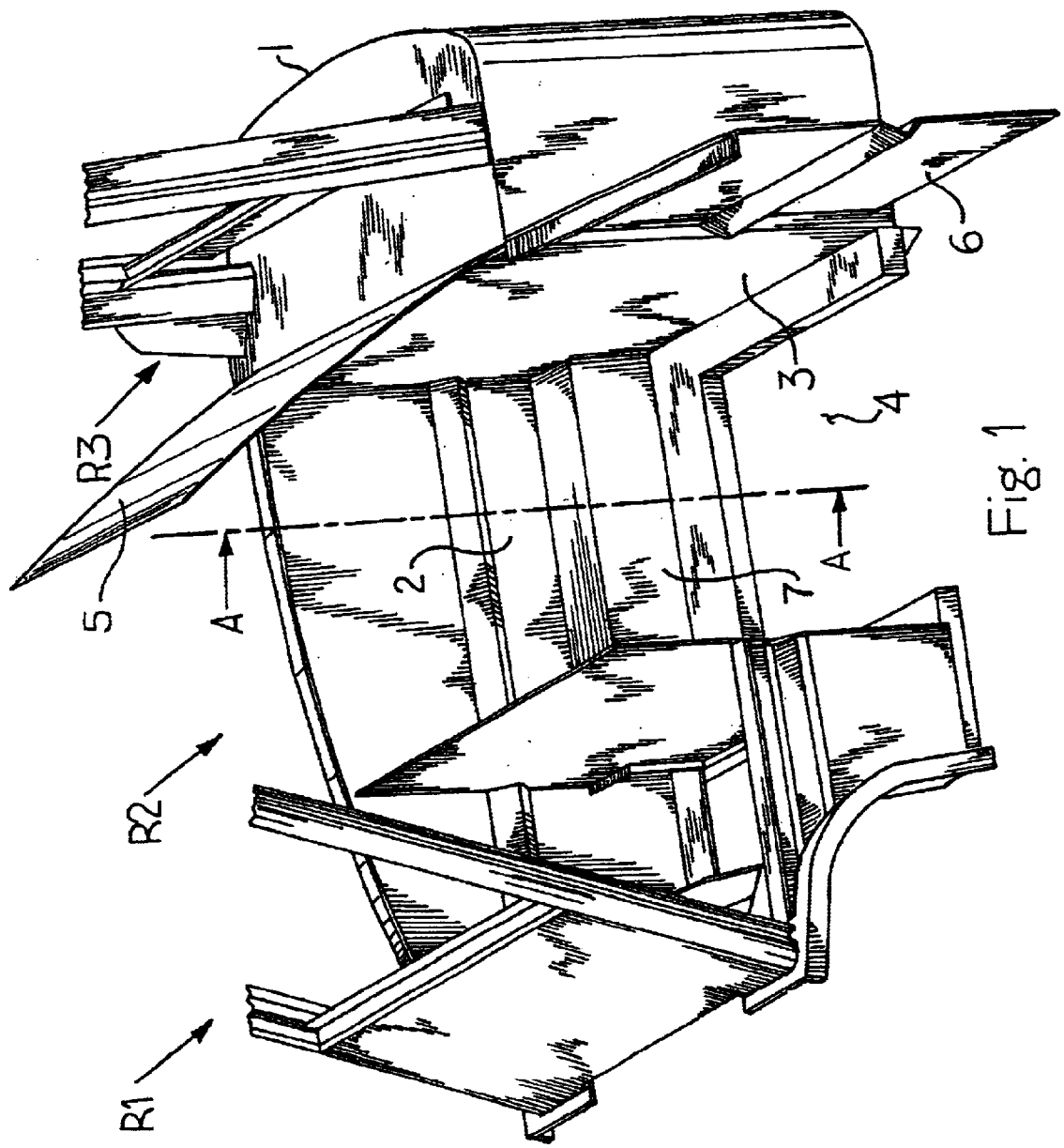
FIG. 1 is a view in perspective of a frame incorporating features of the invention.

A frame of the invention for an industrial truck is designed in this exemplary embodiment for a fork-lift truck and has a forward frame segment R1, a middle frame segment R2, and a rear frame segment R3.

The front axle and a lifting frame (not shown) can be fastened to the front frame segment R1. The rear frame segment R3 supports a counterweight 1. In the middle frame segment R2, there is space for a battery block (which battery block is not shown in the figure).

The middle frame segment R2 has a frame top opening 2, a frame side opening 3, and a frame bottom opening 4. The frame side opening 3 and the frame bottom opening 4 can be connected to one another without interruption. Thus, the battery block can be replaced using all the common battery replacement systems without the need to make modifications to the frame of the industrial truck. The frame top opening 2 and the frame side opening 3 are thereby each large enough so that the battery block can be inserted through them.

The frame top opening 2 can be covered by a folding hood 5. The frame side opening 3 can be closed with a door 6 which, in this exemplary embodiment, can be pivoted outwardly around a substantially vertical axis.

Figure 2:
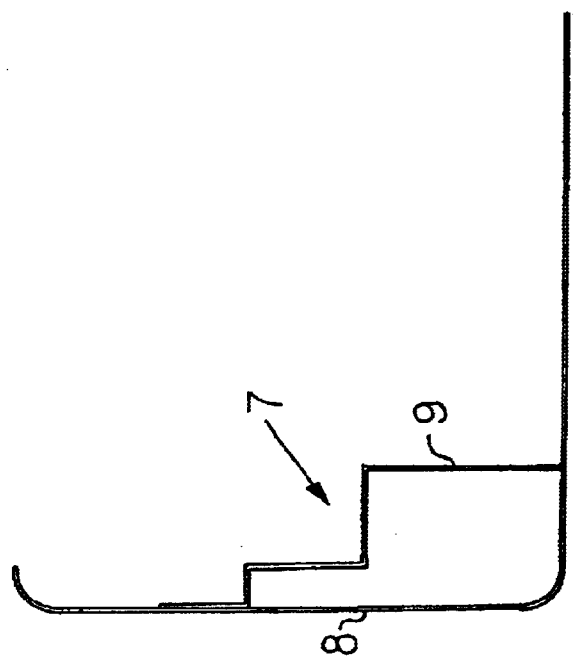
FIG. 2 is a section along Line A—A in FIG. 1.

For stability reasons, the middle frame segment R2 can have a deflection-proof and torsion-proof longitudinal beam 7 that connects the forward frame segment R1 with the rear frame segment R3. The longitudinal beam 7 can have a hollow profile that can be formed by two pieces of sheet metal 8 and 9 that are connected to each other (See FIG. 2). The piece of sheet metal 8 that is on the outside of the frame can form the sidewall of the middle frame segment R2.

Figure 3:
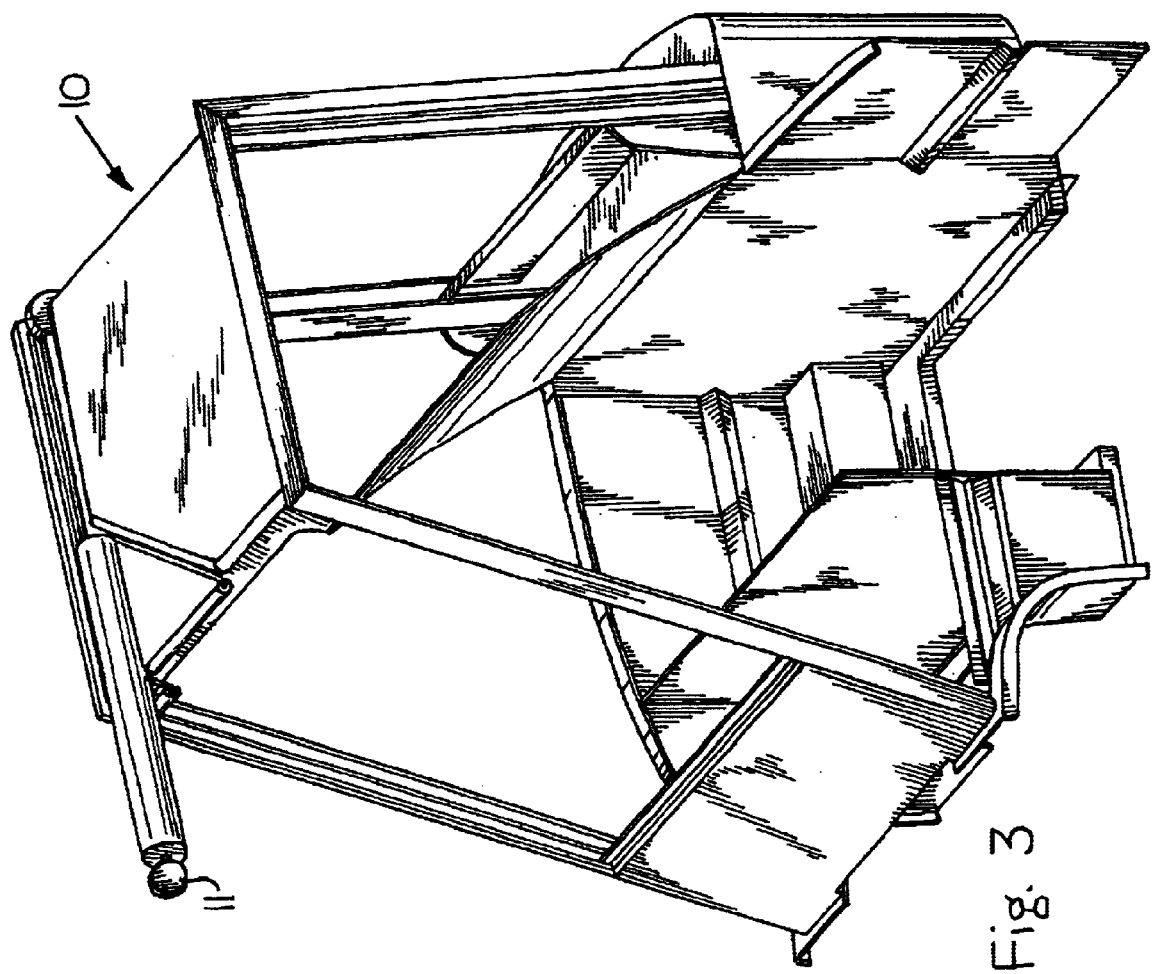
FIG. 3 is a view in perspective of a frame of the invention with a driver protection roof.

FIG. 3 shows a configuration of the invention in which the frame is connected with a driver protection roof 10. In this case, the vertical and horizontal struts, as well as the upper cover plate of the driver protection roof 10, form a load-bearing component of the frame. The driver protection roof 10 thereby contributes to the stability of the frame. In this context, it is also advantageous if the tilting cylinder 11 (or cylinders) of the lifting frame (not shown in the figure) of the fork-lift truck is fastened to the upper end of the driver protection roof 10. The forces introduced into the tilting cylinder(s) 11 are transmitted by the driver protection roof 10 into the rear frame segment R3 and, thus, into the counterweight 1.

Figure 4:
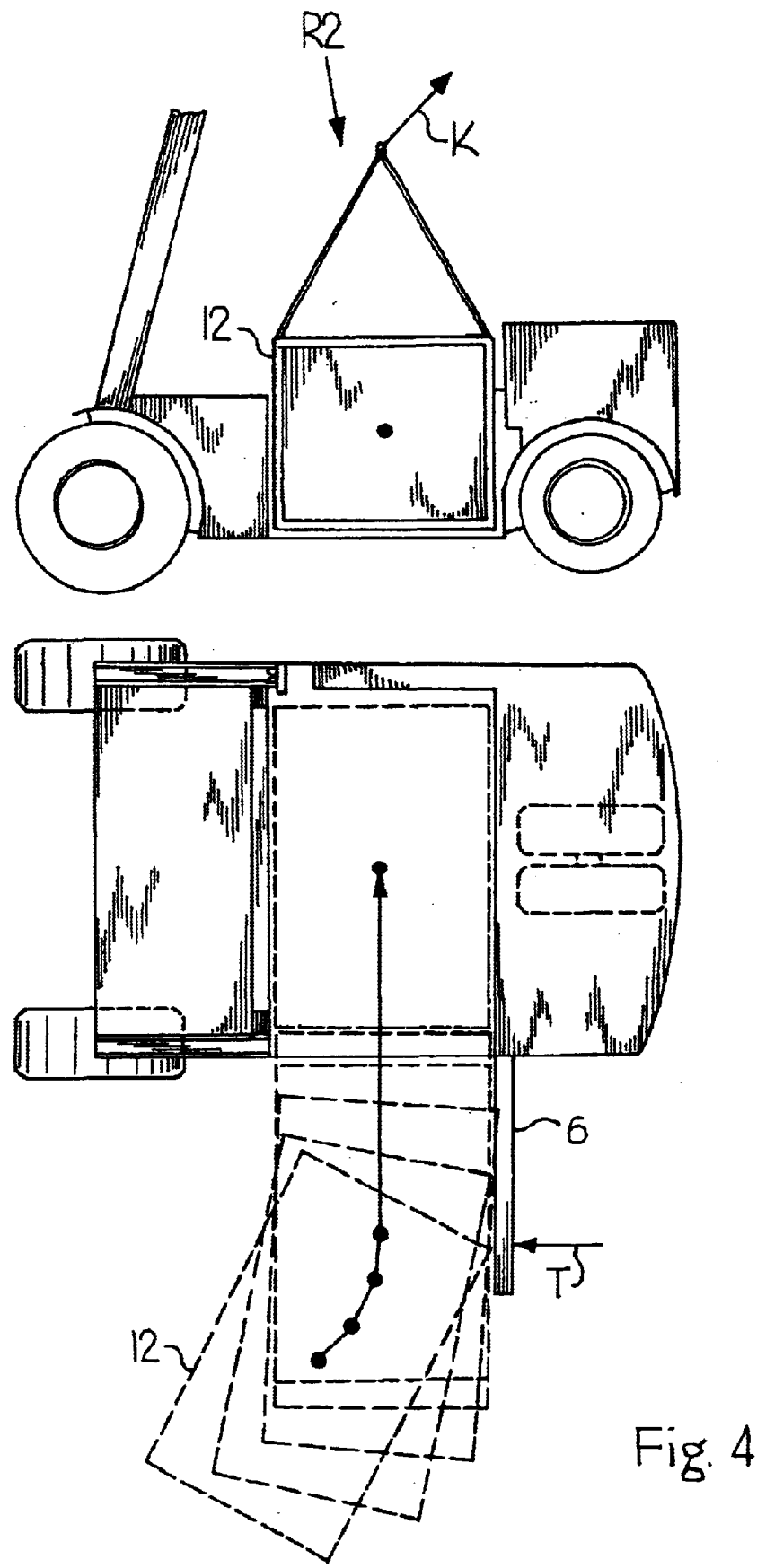
FIG. 4 is a view of the sequence of movements during the horizontal introduction of a battery block into the frame.

FIG. 4 illustrates the insertion of a battery block into the middle frame segment R2 by means of a crane. In this case, the insertion process is significantly facilitated by locking the door 6 in a position in which it is approximately at a right angle to the closed position. A force (arrow K) can then be exerted by the crane on the battery block 12, which has one force component in the direction of the rear frame segment R3. This force component is balanced (arrow T) by means of the locked door 6. Tests have shown that the time required to replace the battery block can thereby be reduced by up to 50%.

FIG. 5 shows a roller device having a frame 13 and a plurality of rollers 14, which roller device can be inserted and fastened (e.g., bolted) into position in the middle frame segment R2. The battery block located on the roller device can then be extracted, after opening the door 6, onto a roller table, and can be transported elsewhere from there.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A frame for a battery-operated industrial truck, comprising:
   a forward frame segment;
   a middle frame segment; and
   a rear frame segment,
      wherein the middle frame segment is configured to hold a battery block and includes a frame top opening and a frame side opening through which the battery block is insertable into and removable from the frame, and
      wherein the frame side opening is connected without interruption to a frame bottom opening of the middle frame segment.

2. The frame as claimed in claim 1, wherein the middle frame segment includes at least one deflection-proof and torsion-proof longitudinal beam that connects the forward frame segment with the rear frame segment.

3. The frame as claimed in claim 2, wherein the longitudinal beam has a hollow profile.

4. The frame as claimed in claim 3, wherein the longitudinal beam includes two pieces of sheet metal that are connected to each other to form the hollow profile, and wherein one of the pieces of sheet metal forms the sidewall of the middle frame segment.

5. The frame as claimed in claim 4, wherein the frame is connected with a driver protection roof which is a load-bearing component of the frame.

6. The frame as claimed in claim 1, including a door pivotable around a substantially vertical axis to open and close the door.

7. The frame as claimed in claim 6, wherein the door is configured to be locked in a right-angle open position.

8. The frame as claimed in claim 1, including a roller device configured to carry the battery block and insertable in the vicinity of the frame bottom opening.

9. The frame as claimed in claim 2, including a door pivotable around a substantially vertical axis to open and close the door.

10. The frame as claimed in claim 3, including a door pivotable around a substantially vertical axis to open and close the door.

11. The frame as claimed in claim 4, including a door pivotable around a substantially vertical axis to open and close the door.

12. The frame as claimed in claim 5, including a door pivotable around a substantially vertical axis to open and close the door.

13. The frame as claimed in claim 2, including a roller device configured to carry the battery block and insertable in the vicinity of the frame bottom opening.

14. The frame as claimed in claim 3, including a roller device configured to carry the battery block and insertable in the vicinity of the frame bottom opening.

15. The frame as claimed in claim 4, including a roller device configured to carry the battery block and insertable in the vicinity of the frame bottom opening.

16. The frame as claimed in claim 5, including a roller device configured to carry the battery block and insertable in the vicinity of the frame bottom opening.

17. The frame as claimed in claim 6, including a roller device configured to carry the battery block and insertable in the vicinity of the frame bottom opening.

18. The frame as claimed in claim 7, including a roller device configured to carry the battery block and insertable in the vicinity of the frame bottom opening.

* * * * *